United States Patent Office 2,808,421  
Patented Oct. 1, 1957

2,808,421
METHOD FOR PREPARING MIXED TRIGLYCERIDE COMPOSITIONS

George Y. Brokaw, Rochester, N. Y., assignor to Eastman Kodak Company, Rochester, N. Y., a corporation of New Jersey No Drawing. Application December 13, 1955, Serial No. 552,952

12 Claims. (Cl. 260—410.8)

This invention relates to a process for preparing mixed triglyceride compositions, and is particularly concerned with a process for preparing compositions containing mixed triglycerides having at least one acetyl radical and at least one fat-forming fatty acid radical.

Mixed triglycerides are "tailor-made" materials which have many useful properties not found in naturally occurring materials. Typical of the mixed triglycerides are the so-called "acetylated monoglycerides" which are comprised of triglycerides containing at least one acetyl radical and at least one fat-forming fatty acid radical. Such mixed triglycerides have many applications, both for food and non-food uses. More specifically, mixed triglycerides can be used as coatings for such foods as hams, weiners, raisins, nuts and the like to reduce dehydration and rancidity; and as plasticizers in such foods as margarine-like spreads and shortenings, and in such cosmetics as hand creams and hair dressings. Likewise, mixed triglycerides have utility as lubricants and release agents. Other uses include coatings for medicinal-containing pills and tablets, components in suppositories, components in emulsions for intravenous injections, special dietary fats, and for a diversity of other uses. It is accordingly desirable to have a process suitable for the preparation of mixed triglycerides.

It is an object of this invention to provide a new method for preparing mixed triglycerides.

It is another object of this invention to provide a novel process suitable for preparing "tailor-made" fatty compositions containing substantial amounts of mixed triglyceride materials.

It is another object of this invention to provide a novel process for preparing mixed triglycerides containing at least one lower acyl radical having two to six carbon atoms and at least one higher acyl radical having more than six carbon atoms.

It is a further object of this invention to prepare mixed triglycerides containing at least one fat-forming fatty acid radical and at least one acetyl radical by novel means.

It is also an object of this invention to prepare a composition comprised essentially of a triglyceride containing two acetyl radicals and one fat-forming fatty acid radical.

It is likewise an object of this invention to provide a novel high temperature catalyst suitable for use in preparing mixed triglycerides.

These and other objects are accomplished by reacting a higher acylated triglyceride containing higher acyl radicals having more than six carbon atoms and a lower acylated triglyceride containing lower acyl radicals having two to six carbon atoms in a reaction medium that is substantially anhydrous and free of substantial amounts of free fatty acids in the presence of a titanium alcoholate catalyst at a temperature higher than about 180° C.

The term "mixed triglycerides" used herein refers to substantially fully esterified glycerides containing at least one lower acyl radical having from two to six carbon atoms, and at least one higher acyl radical having more than six carbon atoms.

Lower acylated triglycerides suitable in the present process include any triglyceride containing acyl radicals having from two to six carbon atoms. Suitable lower acylated triglycerides include such symmetrical triglycerides as triacetin, triproprionin, tributyrin, triisobutyrin, trivalerin and tricaproin, with triacetin being preferably employed.

Any higher acylated triglyceride containing acyl radicals having more than six carbon atoms, suitably from eight to twenty-four carbon atoms, and desirably from twelve to twenty carbon atoms, can be employed, the straight-chain unsubstituted fatty acid radicals being more generally utilized. Such oils as castor oil and similar fatty triglyceride compositions comprising hydroxyl-substituted fatty acid radicals are less suitably used. Higher fatty triglycerides containing fat-forming fatty acids, such as the triglycerides derived from animal fats and vegetable oils are preferably employed. The higher acylated triglycerides can be either hydrogenated or unhydrogenated, the degree of hydrogenation being an important variant in determining the physical properties of the mixed triglyceride product resulting from the present process. Examples of suitable higher acylated triglycerides include trilaurin, trimyristin, tripalmitin, tristearin, triolein, and the like; and such naturally occurring triglycerides as are found in lard, beef tallow, cottonseed oil, soybean oil, peanut oil, coconut oil, palm oil, menhaden oil, corn oil, and in related triglyceride-containing fatty materials. The term "fat-forming fatty acid radical" used herein refers to higher acyl radicals derived from naturally occurring fats and oils, whether hydrogenated or unhydrogenated.

The titanium alcoholate catalyst employed in the present invention can be represented by the formula $Ti(OR)_4$ wherein R is an aliphatic hydrocarbon radical, and preferably wherein R is a lower alkyl radical containing from one to six carbon atoms. Suitable titanium alcoholate catalysts include such compounds as tetra methyl titanate, tetra ethyl titanate, tetra isopropyl titanate, tetra n-butyl titanate, tetra iso-butyl titanate, tetra stearyl titanate, tetra 2-ethyl hexyl titanate, and related compounds. Such titanium alcoholates have other common names. For example, tetra n-butyl titanate is commonly called titanium tetra butoxide, or simply, titanium butoxide. The effectiveness of these titanium alcoholate catalysts does not depend on the mutual or synergistic action of other materials in the reaction mixture as these titanium alcoholate catalysts can act as independent or sole catalytic entities in the instant process.

The amount of titanium alcoholate catalyst employed can be widely varied in accordance with usual triglyceride transesterification practice, amounts as low as 0.05% or lower based on the weight of the triglycerides in the reaction mixture being suitable. More usually, concentrations of catalyst of the order of 0.1% to 1.0% are employed, although amounts as high as 5% can be used, but are usually not necessary.

The reaction is effected at elevated temperatures of at least 180° C., and more generally higher than about 200° C. and less than about 300° C., with temperatures in the range of about 230° C. to about 260° C. being eminently suitable. The reaction time is usually varied from about 15 minutes to 1, 2, or even up to 6 hours, depending on such variants as the reaction temperature, the concentration of the catalyst, the nature of the reactants and other variables common to such reactions.

Substantial amounts of water in the present reaction medium decompose the titanium alcoholate catalysts, and thus, the instant process is effected under substantially anhydrous conditions. The minor proportionate amounts of water generally present in such higher acylated triglycerides as the common commercially available fats and oils, or the lower acylated triglycerides of commerce such as a triacetin, tributyrin and the like, do not substantially effect the present reaction.

Also, titanium alcoholates react with free fatty acids to form titanium soaps which are substantially less active in the immediate reaction. Thus, suitable reaction mediums employed in the present process are free of substantial amounts of free fatty acids, suitably containing as much as about 2%, but more generally containing less than about 1.0% of the combined weight of the higher acylated triglyceride and the lower acylated triglyceride. Typical higher acylated triglycerides such as prime steam rendered lard and refined cottonseed oil usually contain from about 0.5% to 1.0% free fatty acid and can be suitably employed in the present process. Such commercially available lower acylated triglycerides as triacetin and tributyrin usually contain only insignificant amounts (e. g. 0.005%) of acetic acid and butyric acid respectively, and thus, do not substantially affect the activity of the present alcoholate catalysts.

In carrying out the present reaction, the higher acylated triglyceride and the lower acylated triglyceride are reacted in a suitable reactor in the presence of a titanium alcoholate catalyst. The resulting reaction mixture is a composition containing substantial amounts of mixed triglycerides having the following structures:

and

or isomers thereof, wherein R represents a higher acyl radical having more than six carbon atoms, such as a fat-forming fatty acid radical, and R' represents a lower acyl radical having from two to six carbon atoms, such as an acetyl radical. The reactants are more generally reacted at molar ratios of lower acylated triglyceride to higher acylated triglyceride of about 1/4 to about 9/1. Molar ratios of lower acylated triglyceride to higher acylated triglyceride in the reaction mixture ranging from about 1/1 to about 9/1 are preferably employed in the present process for preparing high proportionate amounts of the di-lower acylated mixed triglyceride, and ratios of from about 1/4 to about 2/1 are preferably employed for preparing high proportionate amounts of the mono-lower acylated mixed triglyceride.

The mixed triglyceride composition resulting from the reaction between the higher acylated triglyceride and the lower acylated triglyceride usually contains unreacted lower acylated triglyceride which is preferably substantially completely removed from the reaction product, although such lower acylated triglyceride-containing reaction mixtures have many uses without further "working up" or refining. Compositions containing more than about 1% or 2% of such lower acylated triglycerides as triacetin are extremely bitter, and thus these materials are desirably removed from the reaction mixture, particularly if the mixed triglyceride material is to be used as an edible material. Unreacted portions of the lower acylated triglyceride are usually removed from the reaction mixture by vacuum distillation, and preferably by thin film vacuum distillation, although any other suitable separating means, such as vacuum deodorization, can also be employed. Typical thin film vacuum distillation conditions suitable for removing unreacted triacetin, for example, comprise distillation temperatures up to about 135° C. and pressures of about 15 microns of mercury, although considerable variation is possible in accordance with well-known distillation practice. Likewise, the triacetin can be removed from the reaction mixture by deodorizing at a temperature of about 200° C. and at a pressure of about 1 mm. of mercury, or equivalent conditions. The separated lower acylated triglyceride can be recovered and used in subsequent reactions with higher acylated triglycerides.

The reaction mixture can be further refined to bleach the product and to remove the catalyst. This can be suitably effected by heating the reaction mixture five to ten minutes at a temperature of about 120° C. with about 2% by weight of "Official Activated Bleaching Earth of the American Oil Chemists' Society," and thereafter filtering the resulting mixture.

After removal of the unreacted portions of the lower acylated triglyceride from the reaction mixture the resulting composition can be subjected to thin film vacuum distillation to prepare compositions comprised essentially of mixed triglycerides containing at least one lower acyl radical and at least one higher acyl radical. Such mixed triglyceride compositions are more usually prepared by thin film distillation at temperatures up to about 230° C. and at pressures of about 15 microns of mercury. As before, the conditions set out are subject to considerable variation. The residue resulting from this latter distillation is comprised of substantial amounts of higher acylated triglyceride and can be used in subsequent reactions with additional portions of lower acylated triglycerides.

Mixed triglyceride compositions comprised essentially of either the mono- or the di-lower acylated mixed triglycerides can be prepared by the present process. In illustration, a mono- and a di-acetylated product can be prepared by reacting triacetin and lard in the presence of a catalytic amount of titanium alcoholate such as tetra n-butyl titanate in the manner described hereinabove, stripping off unreacted triacetin by thin film vacuum distillation at temperatures up to about 130° C. and at a pressure of about 15 microns of mercury, subjecting the residue of the first distillation to further thin film vacuum distillation at temperatures up to about 185° C. and at a pressure of about 15 microns of mercury to distill off a composition comprised essentially of diacetylated mixed triglyceride, and thereafter, subjecting the residue of the second distillation to additional thin film vacuum distillation at temperatures up to about 230° C. and at a pressure of about 15 microns of mercury to distill off a composition comprised essentially of monoacetylated mixed triglyceride. As before, these distillation conditions are subject to considerable variation and are merely illustrative.

The invention is further illustrated by the following examples of preferred embodiments thereof, it being understood that the examples are illustrative only and not intended to limit the scope of the invention unless otherwise specifically indicated.

*Example 1*

A 200 g. sample of hydrogenated lard, a 200 g. sample of triacetin and 1.44 g. of tetra ethyl titanate were charged into a one liter round bottom flask. These reactants were substantially anhydrous and free of substantial amounts of free fatty acids. The resulting mixture was brought to a temperature of 250° C. in a few minutes and maintained at that temperature for one hour, the mixture being continually stirred. At the end of the one hour, the resulting reaction mixture was cooled to a temperature of about 130° C. and distilled on a five inch, thin film, centrifugal, vacuum still. A 93 g. fraction comprised essentially of unreacted triacetin was distilled from the reaction mixture at temperatures up to 135° C. and at a pressure of about 40 microns of mercury. Thereafter, a mixed triglyceride composition was distilled in the temperature range of 135° C. to 185° C. at a pressure of 35 microns of mercury. The resulting separated mixed triglyceride composition was comprised essentially of mixed triglycerides containing two acetyl radicals and one fat-forming fatty acid radical derived from the hydrogenated lard reactant. About 179 g. of distilled mixed triglyceride composition resulted for a yield of about 45%. By employing a titanium soap such as titanium stearate as the catalyst in the reaction in lieu of the tetra ethyl titanate catalyst used in this example, the yield of mixed triglyceride composition obtained by distilling in the temperature range of 135° C. to 185° C. at a pressure of about 35 microns of mercury was only 7.7%. By further distilling the residue remaining in the still after the second distillation in the temperature range of about 185° C. to 230° C. at a pressure of about 35 microns of mercury, a mixed triglyceride composition containing substantial amounts of mixed triglycerides having one acetyl radical and two fat-forming fatty acid radicals derived from the hydrogenated lard reactant can be prepared.

*Example 2*

To a 200 g. sample of hydrogenated lard was added 200 g. of triacetin and 2.56 g. of tetra-n-butyl titanate. These reactants were substantially anhydrous and free of substantial amounts of free fatty acids. The resulting mixture was reacted at a temperature of 250° C. for one hour with continuous stirring, cooled to below about 130° C., and thereafter distilled on a five inch, thin film, centrifugal, vacuum still. A 133 g. fraction comprised essentially of unreacted triacetin was distilled off at temperatures up to 135° C. and at a pressure of about 40 microns of mercury. Thereafter, an additional fraction was distilled off in the temperature range of 135° C. to 185° C. at a pressure of 35 microns of mercury. The distillate from the second distillation was a mixed triglyceride composition comprised essentially of mixed triglycerides having two acetyl radicals and one fat-forming fatty acid radical derived from the hydrogenated lard reactant. About 155 g. of mixed triglyceride resulted from the second distillation for a yield of about 39%.

*Example 3*

The distillation residue resulting from the second distillation and the recovered triacetin-containing distillation fraction described in Example 2 were combined with 67 g. of additional triacetin and 107.5 g. of additional hydrogenated lard. No additional tetra-n-butyl titanate catalyst was added. The resulting mixture was reacted at a temperature of 250° C. for one hour with continuous stirring, cooled below about 130° C., and vacuum distilled as described in Example 2. The triacetin-containing fraction which was distilled at temperatures up to 135° C. weighed 141 g., and the mixed triglyceride-containing fraction which was distilled in the temperature range of 135° C. to 185° C. weighed 125 g., the mixed triglyceride-containing fraction showing a yield of about 31%.

Thus, by means of this invention, mixed triglyceride compositions can be readily prepared. More particularly, titanium alcoholates are suitable for catalyzing reactions between higher acylated triglycerides and lower acylated triglycerides to prepare such mixed triglyceride compositions as the "acetylated monoglycerides" and related "tailor-made" fatty compositions.

Although the invention has been described in considerable detail with reference to certain preferred embodiments thereof, it will be understood that variations and modifications can be effected within the spirit and scope of the invention as described hereinabove and as defined in the appended claims.

This application is a continuation-in-part of my co-pending application, U. S. Serial No. 388,065, filed October 23, 1953.

I claim:

1. The process for preparing mixed triglyceride compositions which comprises reacting a higher acylated triglyceride containing higher acyl radicals having more than six carbon atoms and a lower acylated symmetrical triglyceride containing lower acyl radicals having two to six carbon atoms in the presence of a titanium alcoholate catalyst having the formula Ti(OR)4 wherein R is a lower alkyl radical having from one to six carbon atoms, and thereafter removing substantially all of the unreacted portions of said lower acylated triglyceride from the resulting reaction mixture, said reacting being effected at a temperature higher than about 200° C. and less than about 300° C. under substantially anhydrous conditions in a reaction medium free of substantial amounts of free fatty acids.

2. The process for preparing mixed triglyceride compositions which comprises reacting under substantially anhydrous conditions in a reaction medium free of substantial amounts of free fatty acids, triacetin and a higher acylated triglyceride containing higher acyl radicals having more than six carbon atoms, said reacting being effected at a temperature higher than about 200° C. and less than about 300° C. in the presence of a titanium alcoholate catalyst having the formula Ti(OR)4 wherein R is a lower alkyl radical having from one to six carbon atoms.

3. In the preparation of mixed triglyceride compositions, the process which comprises reacting triacetin and a higher acylated triglyceride containing fat-forming fatty acid radicals having more than six carbon atoms in the presence of a titanium alcoholate catalyst having the formula Ti(OR)4 wherein R is a lower alkyl radical having from one to six carbon atoms, said reacting being effected at a temperature higher than about 200° C. and less than about 300° C. under substantially anhydrous conditions in a reaction medium free of substantial amounts of free fatty acids.

4. The process for preparing mixed triglyceride compositions which comprises reacting triacetin and a higher acylated triglyceride containing fat-forming fatty acid radicals having more than six carbon atoms in the presence of a titanium alcoholate catalyst having the formula Ti(OR)4 wherein R is an a lower alkyl radical having from one to six carbon atoms, said reacting being effected at a temperature higher than about 200° C. and less than about 300° C. under substantially anhydrous conditions in a reaction medium free of substantial amounts of free fatty acids, subjecting the resulting reaction mixture to thin film vacuum distillation effective to remove substantially all of the unreacted portions of said triacetin from the resulting reaction mixture, and thereafter subjecting the resulting distillation residue to further thin film vacuum distillation effective to separate from said residue a composition containing a substantial amount of mixed triglyceride containing at least one of said fat-forming fatty acid radicals and at least one acetyl radical.

5. The process for preparing mixed triglyceride compositions which comprises reacting a higher acylated triglyceride containing higher fatty acid radicals having more than six carbon atoms and a lower acylated symmetrical triglyceride containing lower fatty acid radicals having two to six carbon atoms in the presence of a titanium alcoholate catalyst having the formula Ti(OR)4 wherein R is a lower alkyl radical having from one to six carbon atoms, said reacting being effected at a temperature higher than about 200° C. and less than about 300° C. under substantially anhydrous conditions in a reaction medium free of substantial amounts of free fatty acids.

6. The process for preparing mixed triglyceride compositions which comprises reacting a higher acylated triglyceride containing higher fatty acid radicals having more than six carbon atoms and a lower acylated symmetrical triglyceride containing lower fatty acid radicals having two to six carbon atoms in the presence of tetra ethyl titanate, said reacting being effected at a temperature higher than about 200° C. and less than about 300° C. under substantially anhydrous conditions in a reaction medium free of substantial amounts of free fatty acids.

7. The process for preparing mixed triglyceride compositions which comprises reacting a higher acylated triglyceride containing higher fatty acid radicals having more than six carbon atoms and a lower acylated symmetrical triglyceride containing lower fatty acid radicals having two to six carbon atoms in the presence of tetra n-butyl titanate, said reacting being effected at a temperature higher than about 200° C. and less than about 300° C. under substantially anhydrous conditions in a reaction medium free of substantial amounts of free fatty acids.

8. In the preparation of mixed triglyceride compositions, the process which comprises reacting a higher acylated triglyceride containing fat-forming fatty acid radicals having more than six carbon atoms and a lower acylated symmetrical triglyceride containing lower fatty acid radicals having two to six carbon atoms in the presence of a titanium alcoholate catalyst having the formula Ti(OR)$_4$ wherein R is a lower alkyl radical having from one to six carbon atoms, and thereafter removing substantially all of the unreacted portions of said lower acylated triglyceride from the resulting reaction mixture, said reacting being effected at a temperature in the range of about 230° C. to about 260° C. under substantially anhydrous conditions in a reaction medium free of substantial amounts of free fatty acids.

9. In the preparation of mixed triglyceride compositions, the process which comprises reacting a higher acylated triglyceride containing fat-forming fatty acid radicals having more than six carbon atoms and triacetin in the presence of a titanium alcoholate catalyst having the formula Ti(OR)$_4$ wherein R is a lower alkyl radical having from one to six carbon atoms, and thereafter removing substantially all of the unreacted portions of triacetin from the resulting reaction mixture, said reacting being effected at a temperature in the range of about 230° C. to about 260° C. under substantially anhydrous conditions in a reaction medium free of susbtantial amounts of free fatty acids.

10. The process for preparing mixed triglyceride compositions which comprises reacting a higher acylated triglyceride containing fat-forming fatty acid radicals having more than six carbon atoms and a lower acylated symmetrical triglyceride containing lower fatty acid radicals having two to six carbon atoms in the presence of a titanium alcoholate catalyst having the formula Ti(OR)$_4$ wherein R is a lower alkyl radical containing from one to six carbon atoms, subjecting the resulting reaction mixture to thin film vacuum distillation effective to remove substantially all of the unreacted portions of said lower acylated triglyceride from the resulting reaction mixture, and thereafter subjecting the resulting distillation residue to further thin film vacuum distillation effective to separate from said residue a composition containing a substantial amount of mixed triglyceride containing at least one of said fat-forming fatty acid radicals and at least one of said lower acyl radicals, said reacting being effected at a temperature in the range of about 230° C. to about 260° C. under substantially anhydrous conditions in a reaction medium free of substantial amounts of free fatty acids.

11. The process for preparing mixed triglyceride compositions which comprises reacting hydrogenated lard and triacetin in the presence of a titanium alcoholate catalyst having the formula Ti(OR)$_4$ wherein R is a lower alkyl radical having from one to six carbon atoms, said reacting being effected at a temperature in the range of about 230° C. to about 260° C. under substantially anhydrous conditions in a reaction medium free of substantial amounts of free fatty acids.

12. The process for preparing mixed triglyceride compositions which comprises reacting hydrogenated lard and triacetin in the presence of a titanium alcoholate catalyst having the formula Ti(OR)$_4$ wherein R is a lower alkyl radical having from one to six carbon atoms, subjecting the resulting reaction mixture to thin film vacuum distillation effective to remove substantially all of the unreacted portions of triacetin from the resulting reaction mixture, and thereafter subjecting the resulting distillation residue to further thin film vacuum distillation effective to separate from said residue a composition containing a substantial amount of a mixed triglyceride containing two acetyl radicals and one higher fatty acid radical derived from said lard reactant, said reacting being effected at a temperature in the range of about 230° C. to about 260° C. under substantially anhydrous conditions in a reaction medium free of substantial amounts of free fatty acids.

References Cited in the file of this patent

UNITED STATES PATENTS

| | | |
|---|---|---|
| 1,873,513 | Van Loon | Aug. 23, 1932 |
| 2,634,234 | Kuhrt | Apr. 7, 1953 |

OTHER REFERENCES

Dean: Utilization of Fats, 1938, page 119.
Markley: Fatty Acids, 1947, pages 307–308.
Ralston: Fatty Acids and Their Derivatives, 1948, page 544.
Journal of Polymer Science, 7, pages 591–602 (1951).